(12) United States Patent
Hayes

(10) Patent No.: US 10,589,140 B2
(45) Date of Patent: Mar. 17, 2020

(54) EXERCISE DEVICE

(71) Applicant: FITNESS & HEALTH LTD, Belvedere (GB)

(72) Inventor: Antony John Hayes, Belvedere (GB)

(73) Assignee: Fitness & Health Ltd., Belvedere (GB)

( * ) Notice: Subject to any disclaimer, the term of this patent is extended or adjusted under 35 U.S.C. 154(b) by 146 days.

(21) Appl. No.: 15/932,377

(22) PCT Filed: Aug. 11, 2016

(86) PCT No.: PCT/GB2016/052499
§ 371 (c)(1),
(2) Date: Feb. 16, 2018

(87) PCT Pub. No.: WO2017/029475
PCT Pub. Date: Feb. 23, 2017

(65) Prior Publication Data
US 2019/0001172 A1    Jan. 3, 2019

(30) Foreign Application Priority Data

Aug. 17, 2015 (GB) .................................. 1514601.2

(51) Int. Cl.
| | |
|---|---|
| *A63B 7/02* | (2006.01) |
| *A63B 21/068* | (2006.01) |
| *A63B 21/00* | (2006.01) |
| *A63B 21/16* | (2006.01) |
| *A63B 23/12* | (2006.01) |

(52) U.S. Cl.
CPC .............. *A63B 7/02* (2013.01); *A63B 21/068* (2013.01); *A63B 21/151* (2013.01); *A63B 21/16* (2013.01);
(Continued)

(58) Field of Classification Search
CPC ..... A63B 7/02; A63B 21/0557; A63B 21/068; A63B 21/151; A63B 21/16;
(Continued)

(56) References Cited

U.S. PATENT DOCUMENTS

| | | | |
|---|---|---|---|
| 4,059,265 A | 11/1977 | Wieder et al. | |
| 4,492,373 A * | 1/1985 | Dzitzer | .................... A63B 7/00 482/143 |

(Continued)

FOREIGN PATENT DOCUMENTS

EP        2095851 A1    9/2009

OTHER PUBLICATIONS

Search Report under Section 17(5) dated Jan. 21, 2016 from counterpart GB Application No. 1514601.2, 4 pp.
International Search Report and the Written Opinion of the International Searching Authority dated Oct. 25, 2016 in counterpart International application No. PCT/GB2016/052499, 13 pp.

*Primary Examiner* — Megan Anderson
(74) *Attorney, Agent, or Firm* — Shumaker & Sieffert, P.A.

(57) ABSTRACT

An apparatus for suspension training may include at least one supporting strap and at least one moveable handle, wherein the moveable handle further includes a first and second end and the first and second ends further include an engageable locking means and the engageable locking means are in communication with the support strap. In this way the position of the moveable handles may be easily adjusted, increasing the convenience of moving the moveable handles to undertake different exercises using the training or exercise device.

14 Claims, 6 Drawing Sheets

(52) U.S. Cl.
CPC ...... *A63B 21/4035* (2015.10); *A63B 23/1227* (2013.01); *A63B 2220/12* (2013.01); *A63B 2220/16* (2013.01); *A63B 2220/40* (2013.01); *A63B 2220/50* (2013.01); *A63B 2220/62* (2013.01); *A63B 2225/093* (2013.01); *A63B 2225/15* (2013.01)

(58) Field of Classification Search
CPC .......... A63B 21/4035; A63B 23/03541; A63B 23/1227; A63B 2220/12; A63B 2220/16; A63B 2220/40; A63B 2220/50; A63B 2220/62; A63B 2225/09; A63B 2225/093; A63B 2225/15; G01S 19/19
See application file for complete search history.

(56) References Cited

U.S. PATENT DOCUMENTS

| | | | |
|---|---|---|---|
| 5,209,712 A | 5/1993 | Ferri | |
| 6,860,841 B1 | 3/2005 | Mortorano | |
| 9,427,622 B2 * | 8/2016 | Thrasher-Rudd | A63B 7/00 |
| 9,504,865 B2 * | 11/2016 | Skwiot | A63B 7/02 |
| 9,517,374 B2 * | 12/2016 | Alexandrov | A63B 21/4015 |
| 2010/0037433 A1 | 2/2010 | Walker | |
| 2010/0113235 A1 | 5/2010 | Calvagne et al. | |
| 2010/0137112 A1 * | 6/2010 | Harker | A63B 21/0552 |
| | | | 482/92 |
| 2017/0225024 A1 * | 8/2017 | Thrasher-Rudd | A63B 21/0552 |

* cited by examiner

EXERCISE DEVICE

This application is a national stage entry under 35 U.S.C. § 371 of International Application No. PCT/GB2016/052499, filed Aug. 11, 2016, which claims the benefit of GB Application 1514601.2, filed Aug. 17, 2015. The entire contents of International Application No. PCT/GB2016/052499 and G.B. Application 1514601.2 are incorporated herein by reference.

TECHNICAL FIELD

The present disclosure relates to a training or exercise device; in particular a training or exercise device used for suspension training.

BACKGROUND

Exercises where the user's bodyweight provides resistance are a well-known training technique. Whilst such exercises may be conducted without any additional equipment, for example press ups, sit ups and squat jumps, the use of a training device to increase the range of exercises available to the user, and the difficulty of the exercises, is commonplace. Such devices include the Olympic rings and overhead, pull up bars amongst many others. However, such existing devices are limited in both their adjustability and the variety of exercises for which they are suitable.

SUMMARY

Improvements in training devices have been made with the development of home suspension trainers. Such trainers typically include a pair of ringed handles, connected by a supporting strap to a central fixation point, with the user performing a variety of exercises using these ringed handles and their own bodyweight. However, to adjust the position of the ringed handles, the user must use buckles located on the supporting strap, often positioned above the head of the user, proximal to the central fixation point. As such, any adjustment of handle height is difficult and laborious, especially when it is required during training to position the handles such that they are suitable for a different exercise to be undertaken.

Embodiments of this disclosure seek to address this problem.

According to the present disclosure, there is provided an exercise device, including:
at least one supporting strap; and
at least one handle; wherein
the handle includes a first and second end; wherein
the first and second ends each include an engageable locking means; and
the engageable locking means are in communication with the supporting strap, and
the handle is slidably mounted on the supporting strap such that the handle can move from one locked position to a second locked position within the supporting strap.

In this way, a training or exercise device suitable for suspension training, is provided. Such an embodiment is advantageous as the integration of engageable locking means into the moveable handle allows the handle position to be easily adjusted by the user during training. Additionally, such an embodiment is also advantageous as the moveable handle is located between the support straps. This feature increases the stability of the moveable handle, increasing the comfort of the user during training as the twisting or rotation of the moveable handle may be reduced.

Such a reduction in twisting or rotation of the moveable handles may also be preferable as it may guard against undue stress on the user's joints during training. Such a feature may be particularly advantageous when novice users, the elderly, those recovering from injury or others vulnerable to injury are considered.

Furthermore, the use of engageable locking means at both the first and second ends of the moveable handles may allow the full bodyweight of an adult user to be supported. Such a feature is preferable as it increases the range of exercises available to the user during training with the training device.

Preferably, the engageable locking means may further include a quick release mechanism. Such an embodiment is advantageous as it may decrease the time required for the user to adjust the position of the moveable handle. Such a feature may be particularly desirable in training regimes where a rapid sequence of exercises requiring different handle positions is required.

It may also be preferable for the engageable locking means to be a cam buckle. Such a feature may be preferable as a cam buckle may be easily operated by a user and provides a means of rapidly securing and releasing the moveable handle from a location on the supporting strap. Additionally, cam buckles may be durable and, as such, suited to the repeated clamping and release and loads associated with the use of the training or exercise device.

Preferably, the cam buckle may further include an engagement face. The feature of an engagement face may be preferable as it may provide a surface against which the support strap is secured relative to the moveable handle.

It may be preferable for the engagement face to include teeth. Such an embodiment of the training or exercise device may be advantageous as the teeth may increase the frictional force between the engagement face and the support strap, ensuring the moveable handle remains securely located at a position on the supporting strap. It may also be preferable for the engagement face to include ridges, protrusions, an otherwise textured surface or a combination of all aforementioned disclosures.

Preferably, a single supporting strap may be in communication with the first and second ends of the moveable handle. Such an embodiment may be preferable as it reduces the number of components required for the operation of the training or exercise device, increasing the ease of set up for the user. Additionally, such an embodiment may prevent the ends of the supporting strap from reaching the ground and forming a trip hazard.

It may be preferable for the moveable handle to further include at least one guide. Such an embodiment may be preferable as the presence of the guide on the moveable handle may prevent the twisting or tangling of the supporting strap as it moves through the engageable locking means. Such a feature may be preferable for the user as it may increase the speed at which the position of the moveable handle may be adjusted during training.

Preferably, the guide may be located proximal to the first or second ends. Such an embodiment may be preferable as it may reduce the length of the supporting strap between the guide and the engageable locking means, further reducing the potential for the supporting strap to become twisted or tangled.

An embodiment wherein the supporting strap is inserted through the guide may be preferable. In such an embodiment, the supporting strap may be generally restrained in the majority of directions perpendicular to a longitudinal axis of the supporting strap, further reducing the potential for the supporting strap to become twisted or tangled.

It may be preferable for the moveable handle to further include a grip. An embodiment containing this feature may be preferable as the comfort of the user may be increased during training.

It may also be preferable for the grip to include a resiliently mouldable material. Such a feature may be preferable as the grip may change shape as the user grips the moveable handle, ensuring a good ergonomic fit. Subsequently, between exercises or after use, the resiliently mouldable material may return to its original shape such that it may provide a comfortable, ergonomic grip for the user in a new exercise position, or a new user entirely. Additionally, it may be preferable for the grip to include a foam.

Preferably, the moveable handle may have a length of between 300 and 150 mm, more preferably a length between 250 and 200 mm and most preferably a length of 222 mm. Such an embodiment of the disclosure is advantageous as with the moveable handle in these length ranges, the training or exercise device may be used with a single hand. Alternatively, it may be preferable for the moveable handle to be between 15000 and 11000 mm in length, more preferably between 14000 and 12000 mm in length and most preferably 13000 mm in length. In such an embodiment, the training or exercise device may be used with both hands on a single moveable handle. It may also be preferable for the outer perimeter of the moveable handle to be between 80 and 100 mm in length, more preferably 90 mm in length such that the moveable handle fits comfortably within the hand of the user.

In some embodiments, it may be preferable for the training or exercise device to further include at least one carabiner. In such an embodiment, the carabiner may be used to quickly and securely affix the training or exercise device to a support member such as a tree branch, joist or pull up bar. Here, the inclusion of the feature of a carabiner is preferable as it increases the speed at which the training or exercise device may be installed and allows for its temporary installation. It may also be preferable for the carabiner to be in communication with the supporting strap. Alternatively, it may be preferable for the supporting strap to be secured by knotting, looping the supporting strap around a supporting member, a nail, a screw or any combination of the aforementioned disclosures.

It may also be preferable for the training or exercise device to include a plurality of moveable handles. The inclusion of a plurality of moveable handles may be preferable as an increased number of moveable handles results in an increased number of handle positions available to the user at any one time.

Alternatively, it may be preferable for the training or exercise device to include a single moveable handle. Such an embodiment may be preferable as the portability of the training or exercise device may be increased.

It may be preferable for the supporting straps to be constructed from a polymer material. Such a feature is advantageous as polymer materials may be light, durable, strong and resistant to clamping as well as low cost. As such, the use of such a material may be preferable as these properties are well suited to those required of the supporting straps. More preferably, the supporting straps may be constructed from nylon.

It may also be preferable for the training or exercise device to further include a sensor. the sensor may be used to measure variables of the user's workout such as calories burn, exercise repetitions, time or workout intensity.

According to another aspect of the present disclosure, there is provided a system including a plurality of training or exercise devices according to any preceding claim. Here, a plurality of training or exercise devices may be provided to allow for the training of multiple limbs at any one time, or the training of multiple users in a group or class setting, for example in a gymnasium or exercise class.

Also according to this disclosure, there is provided a training device, including:
  at least one supporting strap; and
  at least one moveable handle; wherein
  the moveable handle further includes a first and second end; wherein
  the first and second ends further include an engageable locking means; and
  the engageable locking means are in communication with the support strap.

BRIEF DESCRIPTION OF THE DRAWINGS

The disclosure will now be described by way of example with reference to the following figures.

DETAILED DESCRIPTION

Figure 1:
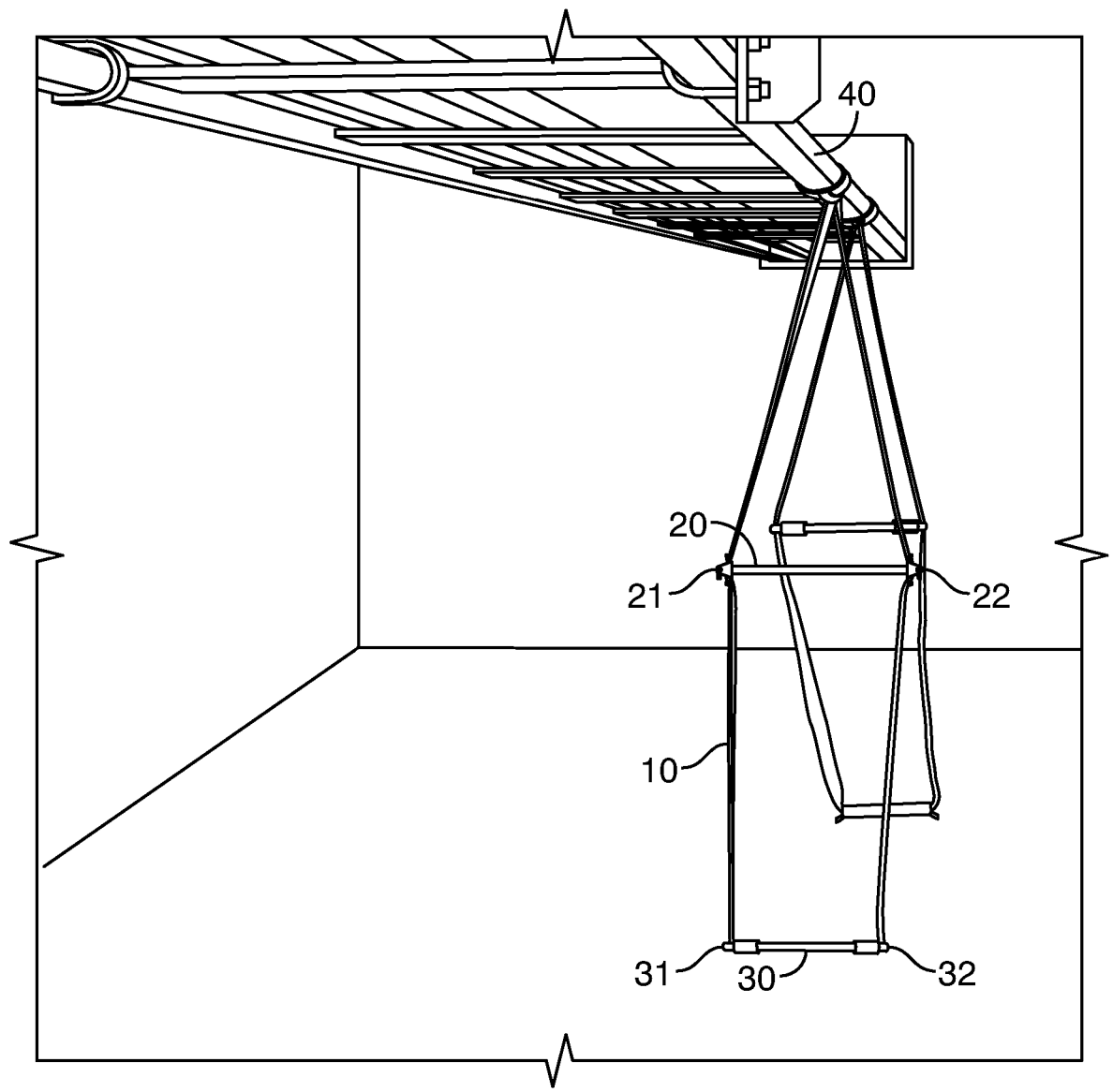
FIG. 1 schematically illustrates the training or exercise device in use.

Referring first to FIG. 1, here the training or exercise device 1 is shown in use. In this embodiment of the disclosure, each training or exercise device 1 consists of a supporting strap 10, and first 20 and second 30 moveable handles. When assembled, the supporting strap 10 is attached to both the first 21, 31 and second 22, 32 ends of both the first 20 and second 30 moveable handles. To form such an attachment, the supporting strap 10 is inserted into an engageable locking means at the first end 21 of the first moveable handle 20 before being inserted into an engageable locking means at the first end 31 of the second moveable handle 32. Subsequently, the supporting strap 10 is inserted into an engageable locking means at the second end 32 of the second moveable handle 30 and into an engageable locking means at the second end 22 of the second moveable handle 20, the supporting strap 10 effectively looping around the moveable handles 20, 30. The free ends of the supporting strap 10 are then affixed to a supporting member 40 to complete the installation of the training or exercise device 1.

In the embodiment of the disclosure depicted in FIG. 1, the free ends of the supporting strap 10 are affixed to the supporting member 40 via a knot. The supporting strap 10 may also be affixed to the supporting member 40 with other suitable means including wrapping, a carabiner or more permanent fixation such as with a screw or nail. Additionally, it is envisaged that the supporting member 40 may take many forms, more specifically a pull up bar, tree branch or joist, although any object capable of supporting the weight of the user may be suitable for use as the supporting member 40.

Figure 2:
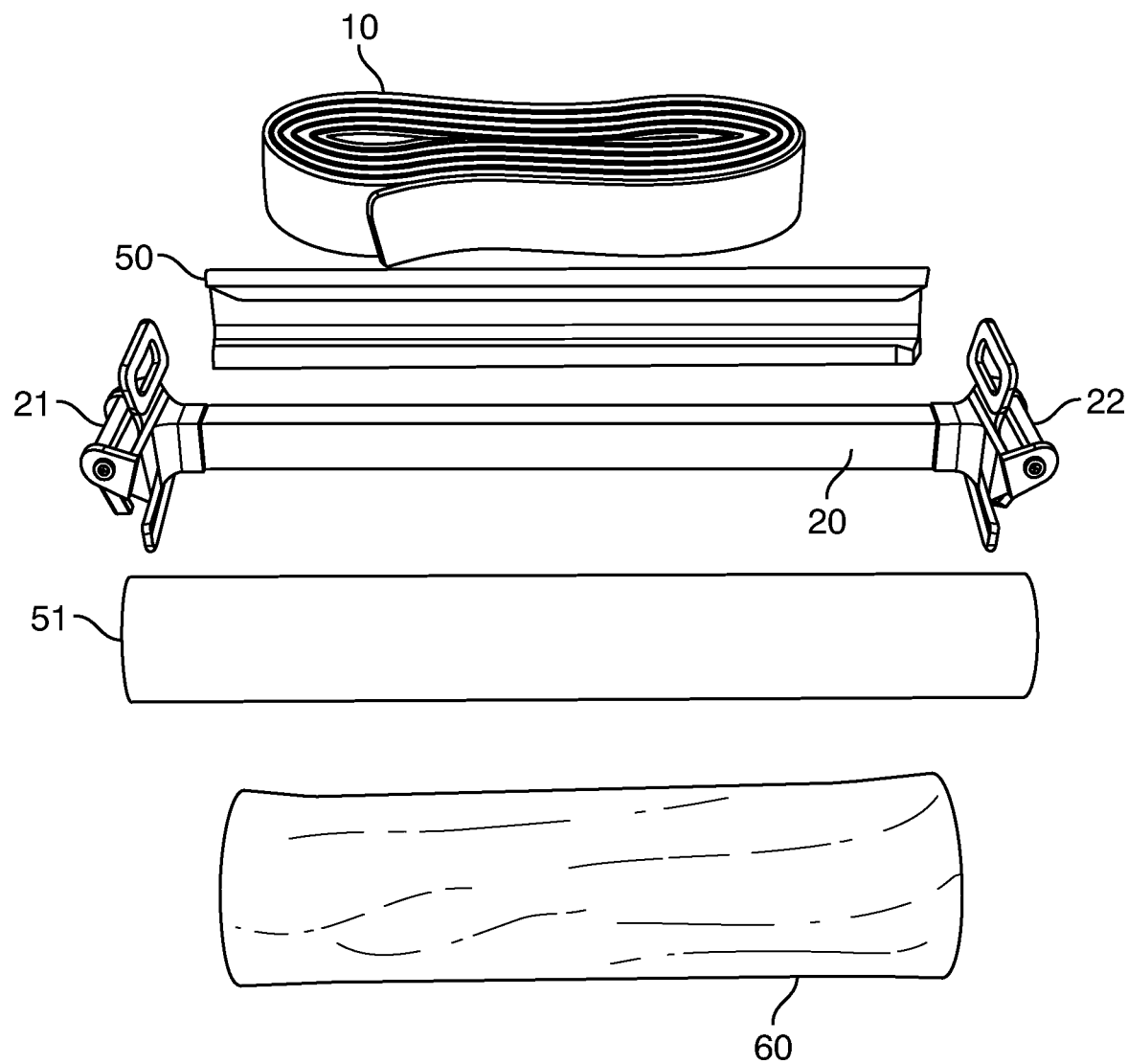
FIG. 2 schematically illustrates the component parts of the training or exercise device.

FIG. 2 depicts the individual components of the training or exercise device. In this embodiment, the supporting strap 10 is constructed from nylon, though other strong yet flexible material may be used to form the supporting strap 10. In this embodiment, the moveable handle 20 is constructed from aluminium due to its lightweight nature. Engageable locking means are present at both the first 21 and second 22 ends of the moveable handle 20, allowing the moveable handle 20 to be securely located at a position required by the user on the supporting strap 10.

FIG. 2 further illustrates the use of a casing to increase the ergonomics of the moveable handle 20. First 50 and second 51 casing pieces may be located around the moveable handle 20, improving the level of comfort experienced by the end user when training or exercise with the device. This level of comfort can be further increased with the use of a grip 60. In this embodiment of the training or exercise device 1 the grip 60 is a foam construction, potentially deforming in the hands of the user to increase their comfort level when training or exercise. In this embodiment the grip 60 is constructed from a nitrile polyvinylchloride, although the use of polyvinylchloride, EPDM, neoprene, rubber or silicone grips is also envisaged.

Figure 3:
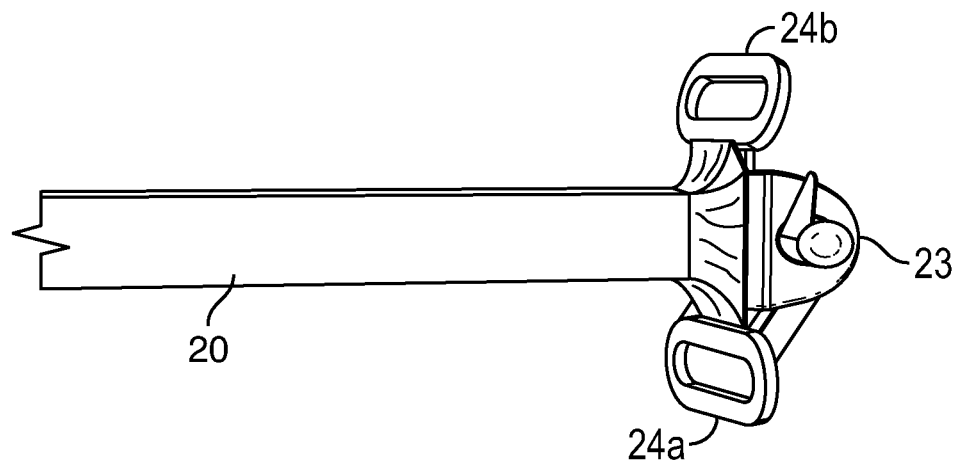
FIG. 3 schematically illustrates the engageable locking means.

FIG. 3 depicts an end of the moveable handle 20. In this embodiment of the disclosure, the moveable handle 20 is connected to an engageable locking means, in this case a cam buckle 23. Here, the cam buckle 23 is connected to the end of the moveable handle 20 via a weld, though other methods of permanent or semi-permanent fixation are envisaged. This permanent or semi-permanent fixation of the cam buckle 23 to the moveable handle 20 allows the moveable handle 20 to be held in a fixed position on the supporting strap 10 as determined by the user. FIG. 3 further depicts first and second guides 24a, 24b located proximal to the cam buckle 23. The depicted guides 24a, 24b may reduce the rotation of the supporting strap 10 close to the cam buckle 23, potentially ensuring the supporting strap 10 is flat as it passes through the cam buckle 23, therefore concomitantly reducing the risk of jamming the cam buckle 23 with the supporting strap 10.

Figure 4:
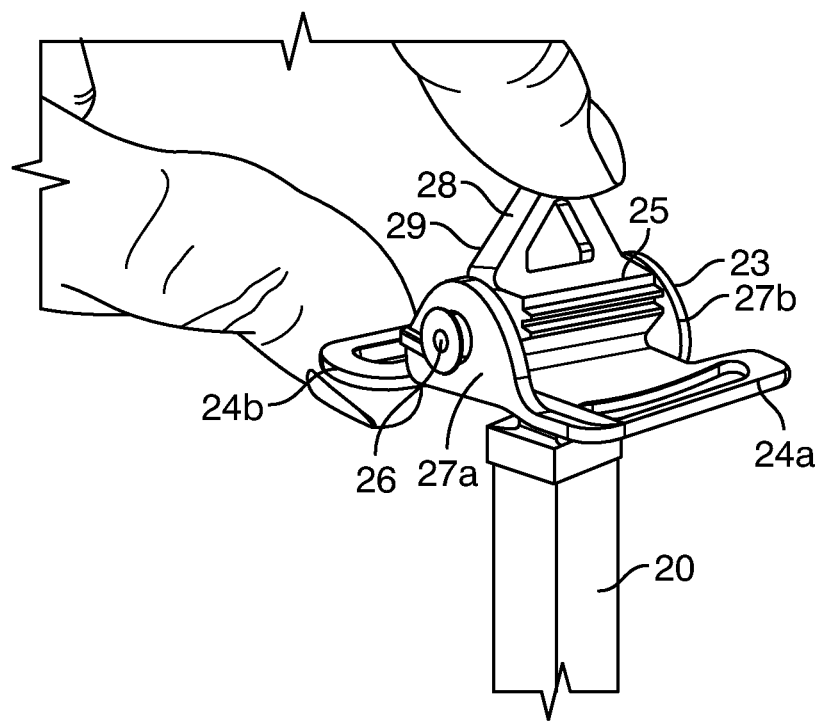
FIG. 4 schematically illustrates the mechanism of the engageable locking means.

FIG. 4 is a more detailed schematic representation of the engageable locking means. Here, the cam buckle 23 can be seen located at the end of the moveable handle 20, located between the first and second guides 24a, 24b. In this embodiment, the cam buckle 23 is composed of a cam body 25 mounted on a central cam axle 26. The cam axle 26 is held in place proximate to the end of the moveable handle 20 with first and second cam flanges 27a, 27b. In this embodiment of the disclosure, the first and second cam flanges 27a, 27b allow the cam axle 26 and thus the cam body 25 to rotate around an axis generally perpendicular to a longitudinal axis of the moveable handle 20.

The rotation of the cam body 25 and cam axle 26 can be controlled by the user via the cam finger 28. In use, the cam finger 28 may be used to rotate the cam body 25 and the cam axle 26 such that an engagement face 29 of the cam body 25 engages with the supporting strap 10. As depicted in FIG. 4, the engagement face includes teeth, ridges or protrusions. In this embodiment of the training or exercise device 1, when the supporting strap 10 is inserted through both the first and second guides 24a, 24b and the cam buckle 23, the engagement face 29 of the cam body 25 may engage with the supporting strap 10 as the engagement face 29 is rotated to approach the end of the moveable handle. Here, the engagement between the engagement face 29 of the cam body 25, the supporting strap 10 and the end face of moveable handle is sufficiently strong that the weight of the user may be supported during use of the training or exercise device 1, without any movement of the moveable handle 20.

Figure 5:
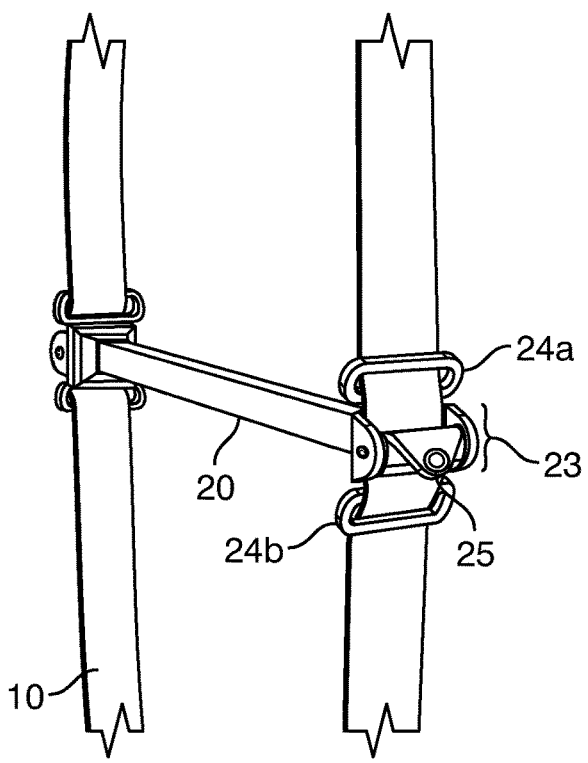
FIG. 5 schematically illustrates the moveable handle installed into the supporting strap.

In FIG. 5, the moveable handle 20 of the training or exercise device 1 is shown connected to the supporting strap 10. In this figure, the insertion of the supporting strap 10 through the first and second guides 24a, 24b and the cam buckle 23 is illustrated. Additionally, the cam body 25 is rotated such that its engagement face 29 is engaged with the supporting strap 10, fixing the moveable handle 20 in position relative to the supporting strap 10 via a frictional force. In this configuration, the moveable handle 20 may support the weight of the user and any additional training equipment such that it remains in a fixed position relative to the supporting strap 10.

Figure 6:
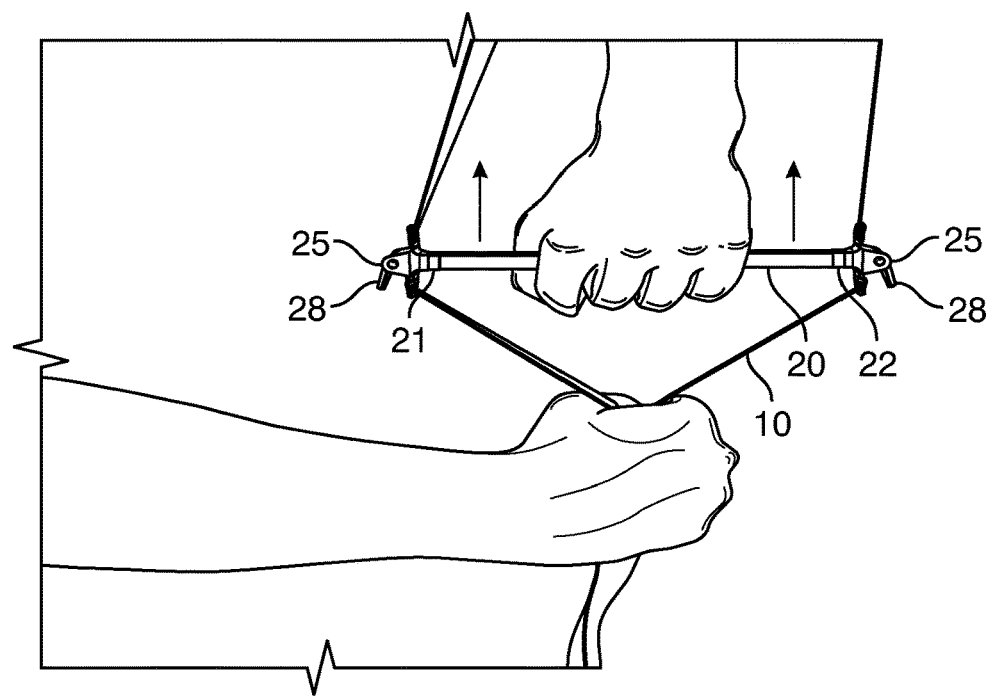
FIG. 6 schematically illustrates raising the position of the moveable handle with respect to the ground.

FIG. 6 schematically illustrates the movement of a moveable handle 20 by a user along the supporting strap 10 in a direction away from the ground; i.e. with the application of a force in the opposite direction to that which is applied whilst training with the training or exercise device 1. To move the moveable handle away from the ground, the user may grip the supporting strap 10 below the moveable handle and apply an upwards force upon the moveable handle 20. This application of an upward force causes the engagement faces 29 of the cam bodies 25 located at both the first and second 21, 22 ends of the moveable handle 20 to disengage from the supporting strap 10, allowing the moveable handle 20 to move relative to the supporting strap 10. When the moveable handle 20 has been moved to a new position as required by the user, the engagement face 29 of the cam body 25 can be rotated by the user with the cam finger 28 such that it reengages with the supporting strap 10, once more locking the moveable handle 20 in place with respect to the supporting strap 10.

Figure 7:
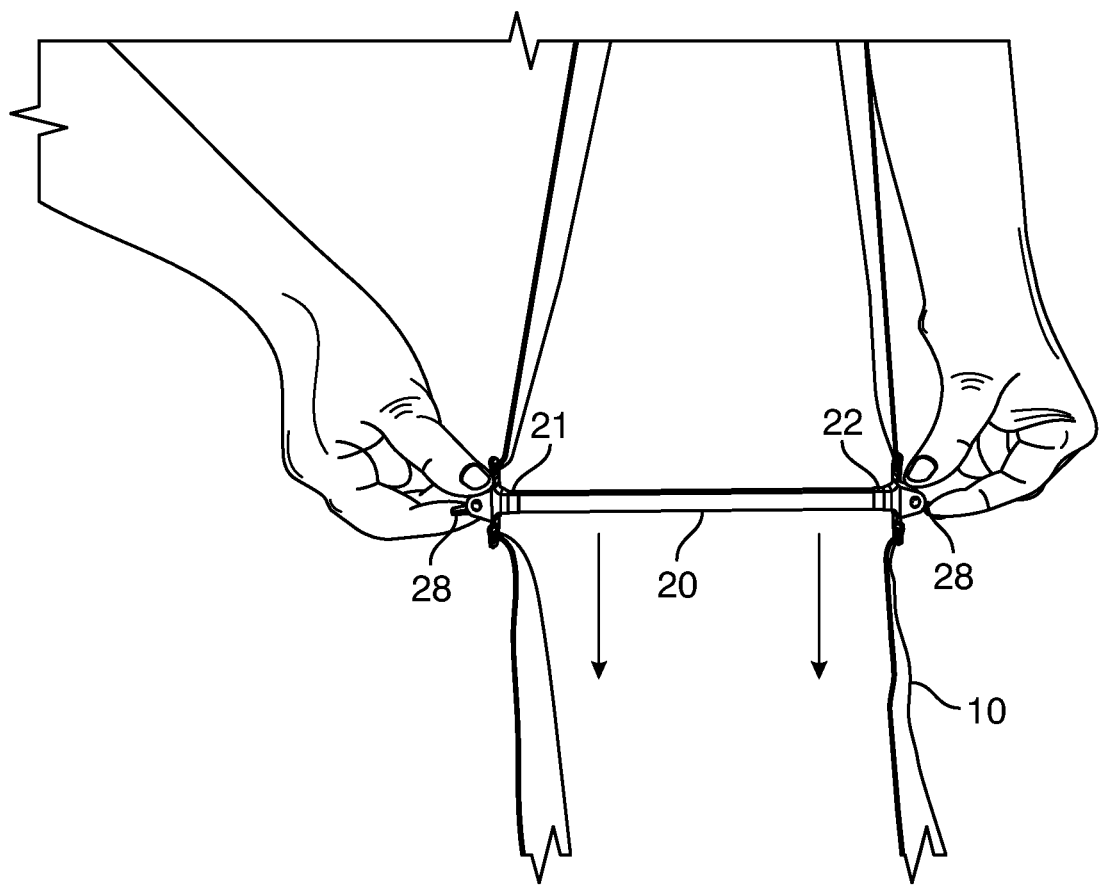
FIG. 7 schematically illustrates lowering the position of the moveable handle with respect to the ground.

FIG. 7 schematically illustrates the movement of a moveable handle 20 by a user along the supporting strap 10 in a direction towards the ground; i.e. with the application of a force in the same direction to that which is applied whilst training with the training or exercise device 1. To move the moveable handle towards the ground, the cam fingers 28 at both first and second 21, 22 ends of the moveable handle 20 are utilised by the user to rotate the cam body 25 and thus rotate the engagement face 29 away from the end face of the moveable handle and out of engagement with the supporting strap 10. The user may then freely move the moveable handle 20 along the supporting strap 10 until said the moveable handle 20 is in the position required by the user. At this point, when the moveable handle 20 has been positioned as required, the user may again use the cam fingers 28 to rotate the cam body 25 and thus the engagement face 29 such that the engagement face 29 again engages with the supporting strap 10, locking the moveable handle 20 into place.

Figure 8:
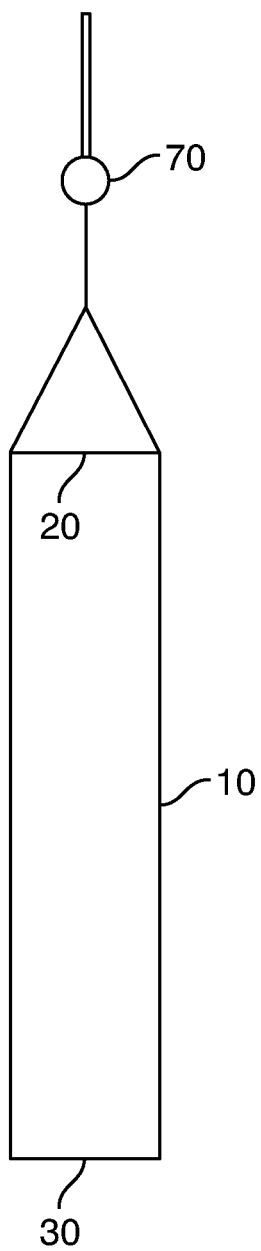
FIG. 8 schematically illustrates the use of a sensor to monitor the user's performance during a training session.

FIG. 8 depicts a sensor 70 mounted to the supporting strap 10. In this embodiment of the disclosure, the sensor 70 may be programmed with at least one of the body weight, age, and gender of the user. Additionally, the sensor 70 may contain a GPS unit to allow the sensor 70 to record the distance travelled with the training or exercise device 1. It is also the case that the sensor 70 may be detached from the training or exercise device 1, allowing the user to use the sensor 70 as a traditional GPS run, cycle or activity tracker.

The sensor 70 may be powered with a rechargeable battery. Here, the longevity of a lithium ion battery is preferred.

During operation, the sensor 70 may measure many variables of interest to the user. Accelerometers, strain gauges and tilt gauges may all be used, to determine various aspects of the workout. For example, the angle of the training or exercise device 1 may be detected by the sensor 70 and, along with the strain detected by the strain gauges, may be used to determine the intensity of the user's training session. Additionally, changes in strain detected by the strain gauges may be used to calculate the number of repetitions undertaken by the user. The total time of a workout may also be detected by the sensor 70, by monitoring the outputs from the accelerometers, strain gauges and tilt gauges. A combination of the intensity of the workout, the other sensor outputs and user data entries may be used to calculate other workout metrics such as power, calories and force exerted, as well as the training effect of the training session.

The invention claimed is:

1. An exercise device comprising:
    at least one supporting strap; and
    at least one handle, wherein:
        the at least one handle comprises a first end and a second end;
        the first and second ends each comprise an engageable locking means;
        the engageable locking means are in communication with the at least one supporting strap;
        the at least one handle is slidably mounted on the at least one supporting strap such that the at least one handle is configured to move from one locked position to a second locked position within the at least one supporting strap;
        the at least one handle further comprises at least one guide; and
        the at least one supporting strap is inserted through the at least one guide.

2. The exercise device according to claim 1, wherein the engageable locking means is a cam buckle.

3. The exercise device according to claim 2, wherein the cam buckle further comprises an engagement face.

4. The exercise device according to claim 3, wherein the engagement face further comprises teeth.

5. The exercise device according to claim 1, wherein the at least one handle further comprises a grip.

6. The exercise device according to claim 5, wherein the grip comprises a resiliently moldable material.

7. The exercise device according to claim 5, wherein the grip comprises a foam.

8. The exercise device according to claim 1, wherein the engageable locking means further comprises a quick release mechanism.

9. The exercise device according to claim 1, wherein the at least one supporting strap is in communication with the first and second ends of the at least one handle.

10. The exercise device according to claim 1, wherein the at least one guide is located proximal to the first end or the second end.

11. The exercise device according to claim 1, wherein the at least one handle comprises a plurality of moveable handles.

12. The exercise device according to claim 1, wherein the at least one supporting strap is constructed from a polymer material.

13. The exercise device according to claim 1, further comprising a sensor.

14. A system for exercise, the system comprising a plurality of exercise devices, each exercise device of the plurality of exercise devices comprising:
    at least one supporting strap; and
    at least one handle, wherein:
        the at least one handle comprises a first end and a second end;
        the first and second ends each comprise an engageable locking means;
        the engageable locking means are in communication with the at least one supporting strap;
        the at least one handle is slidably mounted on the at least one supporting strap such that the at least one handle is configured to move from one locked position to a second locked position within the at least one supporting strap;
        the at least one handle further comprises at least one guide; and
        the at least one supporting strap is inserted through the at least one guide.

* * * * *